(12) United States Patent
Mizrahi et al.

(10) Patent No.: US 10,809,984 B2
(45) Date of Patent: Oct. 20, 2020

(54) SYSTEM FOR GENERATING FUNCTIONALITY REPRESENTATION, INDEXING, SEARCHING, COMPONENTIZING, AND ANALYZING OF SOURCE CODE IN CODEBASES AND METHOD THEREOF

(71) Applicant: COCYCLES, Tel Aviv (IL)

(72) Inventors: Ran Mizrahi, Modiin (IL); Laly Bar-Ilan, Tel Aviv (IL)

(73) Assignee: COCYCLES, Tel Aviv (IL)

( * ) Notice: Subject to any disclaimer, the term of this patent is extended or adjusted under 35 U.S.C. 154(b) by 47 days.

(21) Appl. No.: 16/054,274

(22) Filed: Aug. 3, 2018

(65) Prior Publication Data

US 2018/0373507 A1  Dec. 27, 2018

Related U.S. Application Data

(63) Continuation-in-part of application No. PCT/IL2017/050126, filed on Feb. 2, 2017.
(Continued)

(51) Int. Cl.
*G06F 8/41* (2018.01)
*G06F 40/211* (2020.01)
(Continued)

(52) U.S. Cl.
CPC .............. *G06F 8/433* (2013.01); *G06F 8/36* (2013.01); *G06F 8/75* (2013.01); *G06F 16/951* (2019.01);
(Continued)

(58) Field of Classification Search
None
See application file for complete search history.

(56) References Cited

U.S. PATENT DOCUMENTS 7,155,705 B1 * 12/2006 Hershberg ................ G06F 8/73
717/137
7,627,861 B2 * 12/2009 Smith ....................... G06F 8/75
717/137
(Continued)

OTHER PUBLICATIONS

Vickery, "Sourcegraph: A free code search tool for open source developers", 2015, opensource.com (Year: 2015).*
(Continued)

*Primary Examiner* — Hossain M Morshed
(74) *Attorney, Agent, or Firm* — The Roy Gross Law Firm, LLC; Roy Gross

(57) ABSTRACT

Systems and methods are disclosed for generating functionality representation, indexing, searching, componentizing, an analyzing source code source code unit in a one or more of code repositories. The systems and method include one or more of crawling a set of data entities in a repository system; parsing said set of data entities into abstract syntax trees (ASTs) architecture; modeling said set of data entities into a code graph (CG) architecture; establishing type ontology (TO) architecture of said set of data entities; organizing and storing said set of data entities in functionality representation index (FRI) architecture; componentizing one or more projects in the repositories into code components; and making the components discoverable by functionality and analyzable for performance, usage volume, etc.

20 Claims, 8 Drawing Sheets

Related U.S. Application Data

(60) Provisional application No. 62/290,505, filed on Feb. 3, 2016.

(51) Int. Cl.

| | | |
|---|---|---|
| *G06F 40/242* | (2020.01) | |
| *G06F 16/951* | (2019.01) | |
| *G06F 8/36* | (2018.01) | |
| *G06F 8/75* | (2018.01) | |
| *G06K 9/62* | (2006.01) | |
| *G06N 7/00* | (2006.01) | |

(52) U.S. Cl.
CPC .......... *G06F 40/211* (2020.01); *G06F 40/242* (2020.01); *G06K 9/6267* (2013.01); *G06N 7/00* (2013.01)

(56) References Cited

U.S. PATENT DOCUMENTS

| | | | | |
|---|---|---|---|---|
| 9,378,242 | B1* | 6/2016 | Fontenot | G06F 8/427 |
| 10,169,031 | B2* | 1/2019 | Balasubramanian | G06F 8/70 |
| 2005/0262056 | A1* | 11/2005 | Hamzy | G06F 8/36 |
| 2007/0050343 | A1* | 3/2007 | Siddaramappa | G06F 16/80 |
| 2007/0198484 | A1* | 8/2007 | Ahmed | G06F 16/28 |
| 2009/0178031 | A1* | 7/2009 | Zhao | G06F 8/427 |
| | | | | 717/143 |
| 2010/0106705 | A1* | 4/2010 | Rush | G06F 8/36 |
| | | | | 707/709 |
| 2010/0205541 | A1* | 8/2010 | Rapaport | G06Q 10/10 |
| | | | | 715/753 |
| 2012/0117459 | A1* | 5/2012 | DeHaven | G06F 16/957 |
| | | | | 715/234 |
| 2012/0254835 | A1* | 10/2012 | Muddu | G06F 8/75 |
| | | | | 717/121 |
| 2013/0339365 | A1* | 12/2013 | Balasubramanian | G06F 8/71 |
| | | | | 707/741 |
| 2015/0074633 | A1* | 3/2015 | Slack | G06F 8/75 |
| | | | | 717/101 |
| 2017/0154445 | A1* | 6/2017 | Maruhashi | G06F 21/00 |

OTHER PUBLICATIONS

Yiubun, "CodeGraph2010", 2010, Visual Studio Marketplace (Year: 2010).*

Wang, "Code Search via Topic-Enriched Dependence Graph Matching", 2011, IEEE 2011 18th Working Conference on Reverse Engineering (Year: 2011).*

Katakis, "Automated Tagging for the Retrieval of Software Resources in Grid and Cloud Infrastructures", 2012, 2012 12th IEEE/ACM International Symposium on Cluster, Cloud and Grid Computing (Year: 2012).*

International Search Report PCT/IL2017/050126 completed May 9, 2017; dated May 11, 2017 3 pages.

Written Opinion of the International Search Authority PCT/IL2017/050126 dated May 11, 2017 4 pages.

* cited by examiner

SYSTEM FOR GENERATING FUNCTIONALITY REPRESENTATION, INDEXING, SEARCHING, COMPONENTIZING, AND ANALYZING OF SOURCE CODE IN CODEBASES AND METHOD THEREOF

RELATED APPLICATIONS

This application is a Continuation-In-Part of PCT Patent Application No. PCT/IL2017/050126 having International filing date of Feb. 2, 2017, which claims the benefit of priority of U.S. Provisional Application No. 62/290,505 filed on Feb. 3, 2016 entitled SYSTEM FOR ORGANIZING, FUNCTIONALITY INDEXING AND CONSTRUCTING OF A SOURCE CODE SEARCH ENGINE AND METHOD THEREOF. The contents of the above applications are all incorporated by reference as if fully set forth herein in their entirety

FIELD OF THE INVENTION

The present invention relates generally to computerized techniques for indexing, searching, and reusing source code, and more particularly to constructing a system for identifying source code components and combinations thereof, representing their functional behavior, and facilitating discovery and analytics of the components.

BACKGROUND OF THE INVENTION

Emerging of mobile, cloud computing and distributed development has forced corporations to increase the pace and intensity of application development. Development managers are pressured to deliver software solutions faster, with fewer resources available. For mobile development in particular, OSS offers extremely practical benefits. Many companies face continuous pressure to quickly deploy high-quality mobile applications, and OSS is already deeply integrated in the mobile world.

The price and performance advantages of open source are driving OSS adoption (the industry-standard cost per line of code (LoC) ranges from $10 to $20, and the average component used by Global 2000 company contains 50,000 lines of code; therefore, the use of OSS could save from $500,000 to $1 million per project). The code duplication problem is not solely that of individual programmers, but of the entire software world. Developers within the same organization, and often even within the same development team, write similar code units on a regular basis. This problem causes organizations to spend precious time, effort and money and accumulate substantial technical debt.

But the full benefits of open source are only realized when its use is accompanied by a search component that offers control and precision in this huge source code repository of fragmented data.

The amount of open source code doubles every 14 months, reaching dozens of billions of lines of code to date. However, the vast majority of this code is never used 12 months from its publishing date. This happens mainly because the mechanism for publishing code and the mechanisms for consuming it are incompatible: code is a body of text that is written in a programming language and denotes logic, whereas search queries for code are written in natural language and denote a specific functionality sought by the user. Different models of information searching have been proposed for different professionals, including developers, and professionals using electronic environments as an information source. Different models already include data organization, for example API documentation, code snippets and open source repositories that are indexed and searchable, and are known in the art. However, to date, there hasn't been any adequate solution for this incongruence, resulting in tremendous amounts of inaccessible code and thus in programmers writing the same code over and over again.

Open source software (OSS), the practice of distributing source code along with the executables of a computer program, has had a great impact in the development of modern software and its commercial applications. It is pervasive in today's software lifecycle and supply chain as a part of the Web 2.0 that further facilitates the fast pace growth of the open source. The Web 2.0 and open source together make it available for software developers to have access to more than a million freely downloadable code components with improving integrity, quality and security that could be reused or integrated to create a new piece of software.

Article, Internet-Scale Code Search, by Rosalva E. Gallardo-Valencia and Susan Elliott Sim, discusses Internet-Scale Code Search as the problem of finding source on the Internet. Developers are typically searching for code to reuse as-is on a project or as a reference example. This phenomenon has emerged due to the increasing availability and quality of open source and resources on the web. Solutions to this problem will involve more than the simple application of information retrieval techniques or a scaling-up of tools for code search. Instead, new, purpose-built solutions are needed that draw on results from these areas, as well as program comprehension and software reuse (http://www-.drsusansim.org/papers/suite2009-gallardo.pdf).

Article, Archetypal Internet-Scale Source Code Searching, by Medha Umarji, et al., presents how programmers often search for Open Source code to use it in their projects. To understand how and why programmers search for source code, they conducted a web-based survey and collected data from 69 respondents, including 58 specific examples of searches. Analyzing these anecdotes, they found that they could be categorized along two orthogonal dimensions: motivation (reuse vs. reference example) and size of search target. The targets of these searches could range in size from a block (a few lines of code) to a subsystem (e.g. library or API), to an entire system. Within these six combinations of motivations and target sizes, nine repeating motifs, or archetypes, were created to characterize Internet-scale source code searching. Tools used for searching and the criteria for selecting a component are also discussed. They conclude with guidance on how these archetypes can inform better evaluation of Internet-scale code search engines, as well as the design of new features for these tools. The writers observed that source code search engines were used by 16% of developers when they were looking for source code. Koders, Krugle, Google Code Search, and Sourcerer are some examples of this web resource. These source code search engines create their indexes based on the source code itself. Developers can search for specific keywords and name of methods, but at the same time it is challenging since developers use only natural language in their queries, which only matches with comments in the source code. Those Web resources can be useful to find code snippets to satisfy different types of source code needs, but users who already know to a high level of specificity about what to look for will benefit more from these resources (http://link.springer.com/chapter/10.1007%2F978-0-387-09684-1_21).

Article, Jadeite: improving API documentation using usage information, by Jeffrey Stylos, et al., explores Adeite, a new Javadoc-like API documentation system that takes advantage of multiple users' aggregate experience to reduce difficulties that programmers have learning new APIs. Previous studies have shown that programmers often guessed that certain classes or methods should exist, and looked for these in the API. Jadeite's "placeholders" let users add new "pretend" classes or methods that are displayed in the actual API documentation, and can be annotated with the appropriate APIs to use instead. Since studies showed that programmers had difficulty finding the right classes from long lists in documentation, Jadeite takes advantage of usage statistics to display commonly used classes more prominently. Programmers had difficulty finding the right helper objects and discovering how to instantiate objects, so Jadeite uses a large corpus of sample code to automatically identify the most common ways to construct an instance of any given class. The writers reported that official documentation such as JDK's Javadoc, was used as a starting point to look for source code on the Web. This resource is used mainly to know how to use an API/library or to remember syntactic programming language details or functionality already used. They observed that sometimes developers keep open a browser tab with the website of official documentation and they will browse directly there when they need to remember about syntactic details (http://dl.acm.org/citation.cfm?id=1520678).

Article, Open Source Reuse in Commercial Firms, by T. R. Madanmohan and Rahul De', focuses on the reuse of open source in commercial firms. Open source software provides organizations with new options for component-based development. As with commercial off-the-shelf software, project developers acquire open source components from a vendor and use them "as is" or with minor modifications. Researchers have proposed several structured, formal, or semiformal selection procedures that suggest various attributes to consider when choosing an open source component. To explore these issues from an empirical perspective, a study was conducted based on structured interviews with project developers in large and medium enterprises in the U.S. and India. The goal was to better understand the practices that successful commercial projects use when they incorporate open source components. Attempt here is not only to report the survey results, but also to develop a best-practice approach to open source development based on empirical analysis. The project sampling is limited, and doesn't represent the whole information technology industry. The writers reported two other Web resources also used by developers. These include Freshmeat and corporate portals. The first one maintains an index of Unix and cross-platform software. It also offers news on new releases and a variety of original content on technical, political and social aspects of software and programming. Corporate portals are internal applications where employees of a company keep track of open source projects used (http://dl.acm.org/citation.cfm?id=1032485).

Article, Sourcerer: mining and searching internet-scale software repositories, by Sushil Bajracharya et al., introduces that large repositories of source code, available over the Internet, or within large organizations, create new challenges and opportunities for data mining and statistical machine learning. Here the authors first develop Sourcerer, an infrastructure for the automated crawling, parsing, fingerprinting, and database storage of open source software on an Internet-scale. In one experiment, they gather 4,632 Java projects from SourceForge and Apache totaling over 38 million lines of code from 9,250 developers. Simple statistical analyses of the data first reveal robust power-law behavior for package, method call, and lexical containment distributions. They then develop and apply unsupervised, probabilistic, topic and author-topic (AT) models to automatically discover the topics embedded in the code and extract topic-word, document-topic, and AT distributions. In addition to serving as a convenient summary for program function and developer activities, these and other related distributions provide a statistical and information-theoretic basis for quantifying and analyzing source file similarity, developer similarity and competence, topic scattering, and document tangling, with direct applications to software engineering and software development staffing. Finally, by combining software textual content with structural information captured by their CodeRank approach, they are able to significantly improve software retrieval performance, increasing the area under the curve (AUC) retrieval metric to 0.92—roughly 10-30% better than previous approaches based on text alone. A prototype of the system is available at: http://sourcerer.ics.uci.edu (https://www.igb.uci.edu/~pfbaldi/download/download.inc.php?pid=194)

Article, Mining search topics from a code search engine usage log, by Bajracharya, Sushil, et al., presents a topic modeling analysis of a year long usage log of Koders, one of the major commercial code search engines. This analysis contributes to the understanding of what users of code search engines are looking for. Observations on the prevalence of these topics among the users, and on how search and download activities vary across topics, leads to the conclusion that users who find code search engines usable are those who already know to a high level of specificity what to look for. This paper presents a general categorization of these topics that provides insights on the different ways code search engine users express their queries. The findings support the conclusion that existing code search engines provide only a subset of the various information needs of the users when compared to the categories of queries they look at (http://link.springer.com/article/10.1007%2Fs10664-010-9144-6).

Article, An Empirical Study on Software Development with Open Source Components in the Chinese Software Industry, by Weibing Chen et al., presents how Chinese software companies are increasingly using open source software (OSS) components in software development. Development with OSS components faces challenges with respect to component selection, component integration, licensing compliance, and system maintenance. Although these issues have been investigated in the industry in other countries, few similar studies have been performed in China. It is therefore difficult for Chinese software companies to be aware of their special issues and to make the necessary improvements. This article describes a questionnaire-based survey of software development with OSS components in Chinese software companies. Data from 47 completed development projects in 43 companies were collected. The results show that the main motivation behind using OSS components was their modifiability and low license cost. Using a web search engine was the most common method of locating OSS components. Local acquaintance and compliance requirements were the major decisive factors in choosing a suitable component. To avoid legal exposure, the common strategy was to use components without licensing constraints. The major cost of OSS-based projects was the cost to learn and understand OSS components. Almost 84% of the components needed bug fixing or other changes to the code. However, close participation with the OSS community was rare (http://citeseerx.ist.psu.edu/viewdoc/summary?doi=10.1.1.159.5110).

Article, Assieme: Finding and Leveraging Implicit References in a Web Search Interface for Programmers, by Raphael Hoffmann et al., introduces how programmers regularly use search as part of the development process, attempting to identify an appropriate API for a problem, seeking more information about an API, and seeking samples that show how to use an API. However, neither general-purpose search engines nor existing code search engines currently fit their needs, in large part because the information programmers need is distributed across many pages. We present Assieme, a Web search interface that effectively supports common programming search tasks by combining information from Web-accessible Java Archive (JAR) files, API documentation, and pages that include explanatory text and sample code. Assieme uses a novel approach to finding and resolving implicit references to Java packages, types, and members within sample code on the Web. In a study of programmers performing searches related to common programming tasks, we show that programmers obtain better solutions, using fewer queries, in the same amount of time spent using a general Web search interface (https://homes.cs.washington.edu/~jfogarty/publications/uist2007.pdf).

U.S. Pat. No. 7,472,118 B2, Systems and methods for improving information discovery, by Microsoft Corporation, disclosing a system and methodology to facilitate automated retrieval and classification of information. A system and associated methods are provided that facilitate generation of code and/or documents. The system includes a component that receives data relating to at least one of a user's request for desired code functionality and one or more desired documents. A mapping component correlates parsed subsets of the data to specific functional objects respectively located remote from the user, wherein a generator employs the functional objects to form at least one of the desired code and the documents (https://www.google.com/patents/US7472118).

U.S. Pat. No. 7,216,121 B2, Search engine facility with automated knowledge retrieval, generation and maintenance, by International Business Machines Corporation, discloses a system for generating and retrieving relevant electronic information required by a user initiating an electronic search on the system. The system comprises a user-interactive search engine and a knowledge database, which stores knowledge information that is formatted. Additionally, the system includes a plurality of functional software modules that enables a user to complete an interactive search and find a solution to a task based on entered context information and keywords. A list of keywords is displayed to the user and the user selects those keywords that are relevant to the solution desired. The search engine looks for the articles containing the identified keywords. If no article is found with the search terms, the search is expanded to the Internet. The user may then modify the information returned from the Internet, format the information and save the information as a new recipe (https://www.google.com/patents/US7216121).

U.S. Pat. No. 8,688,676 B2, Source Code Search Engine, by Black Duck Software, Inc., discloses a method of operating a software search engine. The method includes populating a software code database from one or more sources of source code. The method also includes receiving a search query for a software code search engine. The method further includes searching the software code database with the search query. Moreover, the method includes presenting results of the searching. Additionally, the method includes tracking reuse of code portions of the software code database. Also, the method includes reporting on usage of code portions of the software code database (https://www.google.com/patents/US8688676).

U.S. Pat. No. 8,566,789 B2, Semantic-based query techniques for source code, by Infosys Limited, discloses a powerful set of features that can assist software developers in searching source code. Source code can be queried to find occurrences of source code elements mapped to domain concepts appearing in an ontology. Queries can specify a search for occurrences of particular operations performed on domain concepts within the source code. Query expansion can be used to locate related domain concepts as indicated in the ontology. Query keyword weighting can be used to emphasize one domain concept over another. Tools can be provided to create the ontology and associate the ontology with the elements appearing in the source code. Results can include user interface features assisting in navigation to a location within the source code associated with the query results (https://www.google.com/patents/US8566789).

U.S. Pat. No. 7,984,426 B2, Graphical representation of dependencies between changes of source code, by Sap Ag, discloses a system for analyzing and displaying dependencies of change lists tracked by a software configuration management system. The process may include retrieving a set of change lists and traversing each change list to determine dependencies between change lists. The process may generate a graphical representation of a hierarchy of the set of change lists defined by the dependencies. The system may include a file storage system to store a plurality of change lists and a change list analysis module to traverse the plurality of change lists to determine dependencies between the change lists. A graphics module may display change lists and dependencies received from the change list analysis module (www.google.com/patents/US7984426).

U.S. Pat. No. 8,453,106 B2, Graphical user interface for exploring source code execution behavior, by Microsoft Corporation, discloses an interactive graphical user interfaces that visualize execution behavior of source code together with theoretical execution behavior of the source code together with the source code itself. Structure of the source code is analyzed to determine theoretical execution behavior of the source code. Thereafter, symbolic execution of the source code is undertaken to output an execution trace. The execution trace is shown together with the theoretical execution behavior of the source code (https://www.google.com/patents/US8453106).

None of the current technologies and prior art, taken alone or in combination, address or provide a solution for organizing, functionality indexing and constructing a source code search engine employing natural language specifications and code graph representation. Referring to search capabilities, the known technologies in prior art do not refer to the same level of the system scalability to aggregate code, componentize, organize, synthesize and analyze it in order to make it easily accessible, efficient, reusable and user-friendly for a user.

Therefore, there is a long felt and unmet need for a system and method that overcomes the problems associated with the prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

It is thus within the scope of the present invention to disclose a computer-implemented method for organizing, functionality indexing and constructing a source code search engine, the method comprising: crawling a set of data entities in a repository system, each of the data entities representing one or more of a source code units and/or subsets of the source code units; parsing said set of data entities into abstract syntax trees (ASTs) architecture; modeling said set of data entities into a code graph (CG) architecture such that each one or more of a source code units and/or subsets of the source code units are set as vertices and connections between said each one or more of a source code units and/or subsets of the source code units are set as edges; establishing type ontology (TO) architecture of said set of data entities by processing said set of data and assigning meta-data tags to each one or more of a source code units and/or subsets of the source code units, said tags representing classification attributes; generating semantic ID based on linguistic, structural and contextual analyses of said set of data entities, said semantic ID corresponding to source code functionality of said one or more of a source code units and/or subsets of the source code units, said linguistic analysis employing linguistic clues, said structural linguistic analysis employing structural clues, and said contextual analysis employing contextual clues; and organizing and storing said set of data entities in functionality representation index (FRI) architecture. In some implementations, the data entity is selected from the group consisting of integers, strings, Booleans, characters, files, arrays, lists, maps, and tables and any combinations thereof. The method above further comprises storing said set of data entities in one or more storage search server systems. In some implementations, the method includes grouping said set of data entities from said CG and said TO into functional clusters. In some implementations, the method further comprises receiving a query through the client to the storage search server systems. In some implementations, the method further comprises analyzing said query by performing one or more lexical actions. In some implementations, the method further comprises analyzing said query by performing a semantic analysis applying statistical data based on language model (LM) and data acquired from said TO. In some implementations, the method further comprises tagging each word in said query, each tag representing semantic role of said each word in said query. In some implementations, the method further comprises classifying the words in said query into one or more sets of defined query types. In some implementations, the method further comprises retrieving each of the data entities representing one or more of a source code units and/or subsets of the source code units from said TO and said CG through said FRI. In some implementations, the method further comprises ordering a set of results retrieved from said TO and said CG. In some implementations, the method further comprises displaying said set of results.

It is within the scope of the present invention to disclose a system for executing a command in a computing environment to organize, functionality index and construct a source code search engine, the system comprising: a processor; and a memory storing a plurality of instructions executable by the processor, the instructions including: an organizational module (OM) configured to crawl a set of data entities in a repository system, each of the data entities representing one or more of a source code units and/or subsets of the source code units; parse said set of data entities into abstract syntax trees (ASTs) architecture; model said set of data entities into a code graph (CG) architecture such that each one or more of a source code units and/or subsets of the source code units are set as vertices and connections between said each one or more of a source code units and/or subsets of the source code units are set as edges; and establish type ontology (TO) architecture of said set of data entities by processing said set of data and assigning meta-data tags to each one or more of a source code units and/or subsets of the source code units, said tags representing classification attributes; a functionality representation creating module (FRCM) configured to generate semantic ID based on linguistic, structural and contextual analyses of said set of data entities, said semantic ID corresponding to source code functionality of said one or more of a source code units and/or subsets of the source code units, said linguistic analysis employing linguistic clues, said structural linguistic analysis employing structural clues, and said contextual analysis employing contextual clues; and a functionality representation indexing module (FRIM) configured to organize and store said set of data entities in functionality representation index (FRI) architecture.

It is within the scope of the present invention to disclose a non-transitory computer-readable medium storing software comprising instructions executable by one or more computers which, upon such execution, cause the one or more computers to perform operations comprising: crawling a set of data entities in a repository system, each of the data entities representing one or more of a source code units and/or subsets of the source code units; parsing said set of data entities into abstract syntax trees (ASTs) architecture; modeling said set of data entities into a code graph (CG) architecture such that each one or more of a source code units and/or subsets of the source code units are set as vertices and connections between said each one or more of a source code units and/or subsets of the source code units are set as edges; establishing type ontology (TO) architecture of said set of data entities by processing said set of data and assigning meta-data tags to each one or more of a source code units and/or subsets of the source code units, said tags representing classification attributes; generating semantic ID based on linguistic, structural and contextual analyses of said set of data entities, said semantic ID corresponding to source code functionality of said one or more of a source code units and/or subsets of the source code units, said linguistic analysis employing linguistic clues, said structural linguistic analysis employing structural clues, and said contextual analysis employing contextual clues; and organizing and storing said set of data entities in functionality representation index (FRI) architecture.

Advantageously, the described systems and techniques may provide for one or more benefits, such as defining an approach to search for code with lightweight specifications using a constraint solver (e.g., a Satisfiability Modulo Theory (SMT) solver) to identify matching code and illustrating the feasibility and success of this approach using different programming domains including, but not limited to the YAHOO! PIPES domain, SQL queries, JAVA models, traditional programming languages (e.g., JAVA, C, C++, C #, Assembly, Basic), and/or combinations of some or all of the above. Another advantage of the systems and techniques may include providing characterization of how developers use search queries to find source code and to ascertain which questions, asked by developers, are not easily satisfied by keyword-driven search techniques. Such information can be used to increase the likelihood of providing meaningful search results to the developer. Additional advantages may include the ability to assess how search results are selected based on a cost of providing a number of matches for particular specifications, time used for search result retrieval, and effectiveness of a particular search in identifying accurate matches between specifications and source code search results.

It is further within the scope of the present invention to disclose a computer-implemented method for automatically extracting and characterizing code components from a software project, comprising steps of
 a. obtaining one or more software projects stored in a non-transitory computer readable medium;
 b. scraping the projects;
 c. detecting one or more programming languages of each of the projects;
 d. detecting one or more environments of each the project;
 e. parsing each file in each the project to obtain an abstract syntax tree of each the file;
 f. identifying potential components in each the abstract syntax tree, the potential components comprising single nodes and/or collectivized nodes in the abstract syntax tree;
 g. parsing the project across the files of each the project to obtain a project dependency graph of the project, the files being additional potential components of the project;
 h. analyzing usage patterns of the potential components in the ASTs and the project dependency graph;
 i. associating each the potential component with metadata comprising the usage patterns of the component;
 j. generating a functionality representation for each potential component by analyzing the usage patterns, the dependencies and linguistic, contextual, and structural information of potential component;
 k. appending the functionality representation each the potential component to the metadata of the potential component;
 l. classifying a subset of the potential components as code components, using a statistical model trained on componentized projects; the statistical model employing the metadata as features;
 m. creating a component dependency graph, each node of the component dependency graph associated with the code component;
 n. matching the code components with test files of the project, if any, and appending matched test files to the metadata of matched code components;
 o. matching the code components with asset files of the project, if any and appending matched asset files to the metadata of matched code components;
 p. assigning a unique name to each the code component;
 q. classifying each the code component as an external or internal component;
 r. analyzing file dependencies of each the code component to identify a main file, if any, of the code component;
 s. creating edges between component nodes in the component dependency graph, the edges associated with the dependencies and with metadata regarding types of connections between the code components of the component nodes.

It is further within the scope of the present invention to disclose the abovementioned method, wherein the code components comprise code units associated with the metadata rendering the code components consumable and maintainable as independent software entities.

It is further within the scope of the present invention to disclose any of the abovementioned methods, wherein said metadata of each component further comprises package dependencies of the project from which the component was extracted.

It is further within the scope of the present invention to disclose any of the abovementioned methods, wherein the scraping comprises checks, preprocessing, formatting, encoding checks, or any combination thereof.

It is further within the scope of the present invention to disclose any of the abovementioned methods, wherein the project environment comprises a development framework and/or a test framework.

It is further within the scope of the present invention to disclose any of the abovementioned methods, wherein the potential code components comprise folders, files, snippets, regular expressions, or any combination thereof.

It is further within the scope of the present invention to disclose any of the abovementioned methods, wherein the usage statements comprise any in a group consisting of file imports, function calls, class usage, and any combination thereof.

It is further within the scope of the present invention to disclose any of the abovementioned methods, wherein the project dependency graph is language agnostic.

It is further within the scope of the present invention to disclose any of the abovementioned methods, wherein the usage patterns of a the potential component comprise any in a group consisting of: how many times the potential component is required, whether the potential component is required by siblings of the potential component in a same directory as the potential component, whether the potential component is required by a potential component in a parent directory, whether the potential component is required by a potential component in a cousin directory, whether the potential component is required as a whole or one or more parts of the potential component is required, which potential components requires the potential component, in which potential component a class instance used by the potential component is created, which potential components utilizes a class instance created by the potential component, code logic, structure, documentation, variable names, namespaces, file names, directory names, naming patterns across the project, and any combination thereof.

It is further within the scope of the present invention to disclose any of the abovementioned methods, wherein the statistical model employs characteristics of the potential components selected from the usage patterns, names, file type, or any combination thereof.

It is further within the scope of the present invention to disclose any of the abovementioned methods, wherein the asset files comprise typescripts, images, and files, and any combination thereof.

It is further within the scope of the present invention to disclose any of the abovementioned methods, further comprising a step of using the functionality representation to ameliorate the classification.

It is further within the scope of the present invention to disclose any of the abovementioned methods, wherein the internal and external components are assigned an extent, over a distributed range, to which each the code component is reusable in other projects.

It is further within the scope of the present invention to disclose a computer-implemented system for automatically extracting and characterizing code components from a software project, comprising a computer processor non-transitory computer readable memory (CRM), the CRM storing instructions for the processor; the instructions configured to
  a. obtain one or more software projects stored in a non-transitory computer readable medium;
  b. scrape the projects;
  c. detect one or more programming languages of each of the projects;
  d. detect one or more environments of each the project;
  e. parse each file in each the project to obtain an abstract syntax tree of each the file;
  f. identify potential components in each the abstract syntax tree, the potential components comprising single nodes and/or collectivized nodes in the abstract syntax tree;
  g. parse the project across the files of each the project to obtain a project dependency graph of the project, the files being additional potential components of the project;
  h. analyze usage patterns of the potential components in the abstract syntax trees of each the project;
  i. analyze usage patterns of the potential components in the project dependency graph;
  j. associate each the potential component with metadata comprising the usage patterns of the component;
  k. classify a subset of the potential components as code components, using a statistical model trained on componentized projects in the detected programming language to search each the potential component for a functionality and an interface, the code components possessing a functionality and an interface for use by other code components;
  l. create a component dependency graph, each node of the component dependency graph associated with the code component and with metadata comprising the functionality representation and the interface;
  m. match the code components with test files of the project and appending matched test files to the metadata of matched code components;
  n. match the code components with asset files of the project and appending matched asset files to the metadata of matched code components;
  o. assign a unique name to each the code component;
  p. classify each the code component as an external or internal component;
  q. analyze file dependencies within each the code component to identify a main file of the code component;
  r. create edges between component nodes in the component dependency graph, the edges associated with the dependencies and with metadata regarding types of connections between the code components of the component nodes.

It is further within the scope of the present invention to disclose the abovementioned system, wherein the code components comprise code units associated with the metadata rendering the code components consumable and maintainable as independent software entities It is further within the scope of the present invention to disclose any of the abovementioned systems, wherein said metadata of each component further comprises package dependencies of the project from which the component was extracted.

It is further within the scope of the present invention to disclose any of the abovementioned systems, wherein the scraping comprises checks, preprocessing, formatting, encoding checks, or any combination thereof.

It is further within the scope of the present invention to disclose any of the abovementioned systems wherein the project environment comprises a development framework and/or a test framework.

It is further within the scope of the present invention to disclose any of the abovementioned systems, wherein the potential code components comprise folders, files, snippets, regular expressions, or any combination thereof.

It is further within the scope of the present invention to disclose any of the abovementioned systems, wherein the usage statements comprise any in a group consisting of file imports, function calls, class usage, and any combination thereof.

It is further within the scope of the present invention to disclose any of the abovementioned systems, wherein the project dependency graph is language agnostic.

It is further within the scope of the present invention to disclose any of the abovementioned systems, wherein the usage patterns of a the potential component comprise any in a group consisting of: how many times the potential component is required, whether the potential component is required by siblings of the potential component in a same directory as the potential component, whether the potential component is required by a potential component in a parent directory, whether the potential component is required by a potential component in a cousin directory, whether the potential component is required as a whole or one or more parts of the potential component is required, which potential components requires the potential component, in which potential component a class instance used by the potential component is created, which potential components utilizes a class instance created by the potential component, code logic, structure, documentation, variable names, namespaces, file names, directory names, naming patterns across the project, and any combination thereof.

It is further within the scope of the present invention to disclose any of the abovementioned systems, wherein the statistical model employs characteristics of the potential components selected from the usage patterns, names, file type, or any combination thereof.

It is further within the scope of the present invention to disclose any of the abovementioned systems, wherein the asset files comprise typescripts, images, and files, and any combination thereof.

It is further within the scope of the present invention to disclose any of the abovementioned systems, further comprising a step of using the functionality representation to ameliorate the classification.

It is further within the scope of the present invention to disclose any of the abovementioned systems, wherein the internal and external components are assigned an extent, over a distributed range, to which each the code component is reusable in other projects.

It is further within the scope of the present invention to disclose a computer-implemented method for providing discoverability and analytics for software components in a codebase, comprising steps of
 a. obtaining one or more component dependency graphs of code components stored in a code repository, the code components each associated with metadata comprising a functionality representation of the component;
 b. indexing the functionality representations;
 c. indexing language models;
 d. indexing dictionaries, lexicons, and ontologies;
 e. grouping code components' from the component dependency graphs into functional clusters;
 f. storing the functional clusters in a functionality representation index (FRI);
 g. mapping a natural language query to one or more functional identifiers (FRIDs) in the FRI and producing a set of ranked results;
 h. analyzing the code components; and
 i. displaying results of analyzing code components and insights and analysis regarding entire projects and codebase repositories with more than one project.

It is further within the scope of the present invention to disclose the abovementioned method, wherein the functionality is defined by features of the component selected from a group comprising actions performed, entities performed on, interaction with other components and APIs, complexity, execution time, test results, and any combination thereof.

It is further within the scope of the present invention to disclose any of the abovementioned methods, further comprising a step of applying a statistical n-gram model to programming terms among the semantic functionalities, thereby generating a dictionary of the functionalities.

It is further within the scope of the present invention to disclose any of the abovementioned methods, further comprising a step of searching the functionalities from search terms filtered through the dictionary.

It is further within the scope of the present invention to disclose any of the abovementioned methods, further comprising a step of performing code analytics on the components.

It is further within the scope of the present invention to disclose any of the abovementioned methods, wherein the step of mapping the natural language query is followed by a step ranking the corresponding components.

It is further within the scope of the present invention to disclose any of the abovementioned methods, further comprising receiving the query through a client to a storage search server system from a user.

It is further within the scope of the present invention to disclose any of the abovementioned methods, further comprising ordering a set of results retrieved from a TO and a CG.

It is further within the scope of the present invention to disclose any of the abovementioned methods, further comprising a step of tagging each word or phrase in the query, each tag representing semantic role of each word in the query.

It is further within the scope of the present invention to disclose any of the abovementioned methods, further comprising a step of classifying the words in the query into one or more sets of defined query types.

It is further within the scope of the present invention to disclose any of the abovementioned methods, further comprising a step of selecting the corresponding components among those with common characteristics, the characteristics consisting of a programming language, environment, project domain, previously used components, and any combination thereof.

It is further within the scope of the present invention to disclose any of the abovementioned methods, wherein the step of analyzing comprises any in a group consisting of analysis of an organization's: projects, codebase, list of structurally and functionally duplicate components, components created by an individual developer, most widely used components, components best implementing the functionality, and any combination thereof.

It is further within the scope of the present invention to disclose any of the abovementioned methods, wherein the code components are from a plurality of projects within one or more organizational or public codebases.

It is further within the scope of the present invention to disclose any of the abovementioned methods, further comprising a step of displaying results of the step of analyzing code components to a user.

It is further within the scope of the present invention to disclose a system for discovering and analyzing software components in a codebase, comprising a computer processor non-transitory computer readable memory (CRM), the CRM storing instructions for the processor to create and operate modules of the system, the modules comprising
 a. a component dependency graph database configured to store one or more component dependency graphs of code components stored in a code repository and associated metadata comprising a functionality representation of each the component;
 b. a feature indexing module configured to
   i. index the functionality representations;
   ii. index language models;
   iii. index dictionaries, lexicons, and ontologies;
   iv. group code components from the component dependency graphs into functional clusters; and
 c. a functionality representation index configured to store the functional clusters (FRI);
 d. a component search engine configured to map a natural language query to one or more functional identifiers (FRIDs) in the FRI and produce a, set of ranked results;
 e. a codebase analytics module, in connection with a display, configured to analyze the code components and display the code component analysis and insights and analysis regarding entire projects and code bases (repositories with more than one project); and
 f. a display module configured to display the component analysis.

It is further within the scope of the present invention to disclose the abovementioned system, wherein the functionality is defined by features of the component selected from a group comprising actions performed, entities performed on, interaction with other components and APIs, complexity, execution time, test results, and any combination thereof.

It is further within the scope of the present invention to disclose any of the abovementioned systems, further comprising one or more dictionary modules configured to apply a statistical n-gram model to programming terms among the semantic functionalities, thereby generating a dictionary of the functionalities.

It is further within the scope of the present invention to disclose any of the abovementioned systems, further configured to search the functionalities from search terms filtered through the dictionary.

It is further within the scope of the present invention to disclose any of the abovementioned systems, wherein the mapping the natural language query is followed by a step ranking the corresponding components.

It is further within the scope of the present invention to disclose any of the abovementioned systems, further comprising receiving the query through a client to a storage search server system from a user.

It is further within the scope of the present invention to disclose any of the abovementioned systems, further comprising ordering a set of results retrieved from a TO and the CG.

It is further within the scope of the present invention to disclose any of the abovementioned systems, further configured to tag each word or phrase in the query, each tag representing semantic role of each word in the query.

It is further within the scope of the present invention to disclose any of the abovementioned systems, further configured to classify the words in the query into one or more sets of defined query types.

It is further within the scope of the present invention to disclose any of the abovementioned systems, further configured to select the corresponding components among those with common characteristics, the characteristics consisting of a programming language, environment, project domain, previously used components, and any combination thereof.

It is further within the scope of the present invention to disclose any of the abovementioned systems, wherein the analyzing comprises any in a group consisting of analysis of an organization's: projects, codebase, list of structurally and functionally duplicate components, components created by an individual developer, most widely used components, components best implementing the functionality, and any combination thereof.

It is further within the scope of the present invention to disclose any of the abovementioned systems, wherein the code components are from a plurality of projects within one or more organizational or public codebases.

It is further within the scope of the present invention to disclose any of the abovementioned systems, configured to display results of the analyzing of code components to a user.

The details of one or more embodiments are set forth in the accompanying drawings and the description below. Other features, objects, and advantages of the invention will be apparent from the description and drawings, and from the claims.

BRIEF DESCRIPTION OF THE DRAWINGS

In order to better understand the invention and its implementation in a practice, a plurality of embodiments will now be described, by way of non-limiting example only, with reference to the accompanying drawings, in which FIG. 1 graphically illustrates, according to a preferred embodiment of the present invention, a flow chart, according to another preferred embodiment, of the present invention method for organizing, functionality indexing and constructing a source code search engine.

DETAILED DESCRIPTION OF THE PREFERRED EMBODIMENTS

Figure 1:
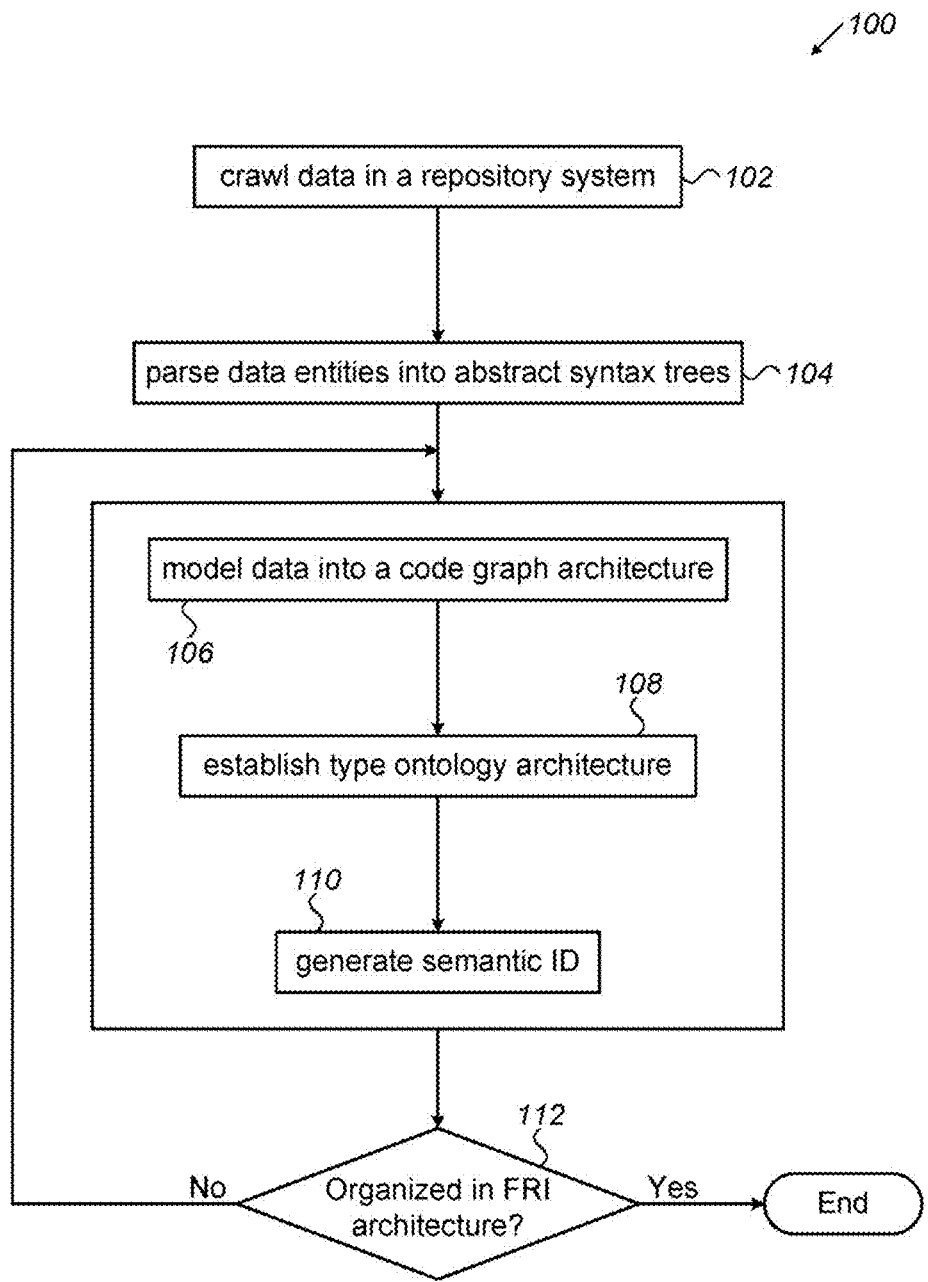

The following description is provided, along all chapters of the present invention, so as to enable any person to make use of said invention and sets forth the best modes contemplated by the inventor of carrying out this invention. As is customary, it will be understood that no limitation of the scope of the invention is thereby intended. Further modifications will remain apparent to those skilled in the art, since the generic principles of the present invention have been defined specifically to provide means and methods for code organization, componentization, functionality representation and construction of code search and analytics engines.

Typically, developers (i.e., programmers/users) rely on keyword-based search engines to find code to reuse in their own designs or to research a best mode of implementing an idea in code, for example. In some situations, the search may become overwhelming and frustrating if, for example, the developer receives a large number of search results that are not relevant to their task when attempting a keyword-driven search for a particular program (e.g., source code). To reduce the possibility of being provided too many search results, the developer can attempt to manually refine the search query by guessing at more keywords or modifying keywords such that fewer results are provided. However, such a method can become tedious to implement for each and every search request. The systems and techniques described in this document provide a mechanism for developers to use search engines and quickly gather desired code by enabling incremental semantic searching functionality in which a developer provides lightweight natural language specifications, a functionality representation module programs to classification attributes, and a search engine to identify which code units match the specifications.

Determining suitable source code that aligns with user-entered specifications may include comparing portions of the specifications to known repositories of source code. Such repositories may be part of an internet, intranet, Local Access Network (LAN), and/or a Virtual Private Network (VPN). In addition, the repositories can be found as part of an online community, and/or may include online search repositories, open source code repositories, public or private software artifact repositories (i.e., software artifacts may include documents, requirements, and source code associated with software), manipulated search repositories, private search repositories, re-indexed search repositories, and/or other known code storage space or any combination of the above. In some implementations, particular repositories can be manipulated, combined, and/or restructured to increase the likelihood of finding documents stored in the repositories. For example, repositories of source code can be indexed according to a number of schemes to enable a user to find source code in an accurate and timely fashion. Examples of indexing according to such schemes are described below.

The terms "developer", "programmer", and "user", used interchangeably in the present invention, refer hereinafter to any party that develops and/or uses software solutions via source code reuse.

The term "code unit" refers hereinafter to any data entity comprising source code having a clear encapsulated functionality. A code unit can be, for example, a regular expression, a code snippet, a code file, a directory, or an entire library.

The term "code component" refers hereinafter to a code unit associated with metadata such as information regarding the development environment, the testing environments, related test files, dependencies, functionality, and/or API of the code unit, which enables it to be consumed and reused by other software.

The term "functionality," used interchangeably in the present invention, refers hereinafter to any means of aggregation of and relations between actions, entities, qualifiers, manners of operation, design patterns, data flows, timings, dependencies, inputs, outputs, and any attribute of code which relates to its intended purpose and specific implementation and any combinations thereof.

The term "functionality representation" refers hereinafter to a semantic term describing the functionality of a code component.

The term "project dependency graph" refers hereinafter to a graph whose edges represent which files in a project are dependent on other files, as well as third-party libraries, components, files, etc. (Dependencies within files are represented by an abstract syntax tree, as is known in the art).

The term "component dependency graph" refers hereinafter to a graph whose edges represent which code components—both within and across files—are dependent on other code components. The edges are associated with metadata specifying the nature of the dependencies.

As a non-limiting example, the source code mining, establishing semantic representation layers of code functionality and matching it to queries can be executed using a computerized process according to the example method 100 illustrated in FIG. 1. As illustrated in FIG. 1, the method 100 can first crawl a set of data entities in a repository system 102, each of the data entities representing one or more of a source code units and/or subsets of the source code units; parse said set of data entities into abstract syntax trees (ASTs) architecture 104; model said set of data entities into a code graph (CG) architecture 106 such that each one or more of a source code units and/or subsets of the source code units are set as vertices and connections between said each one or more of a source code units and/or subsets of the source code units are set as edges; establish type ontology (TO) architecture 108 of said set of data entities by processing said set of data and assigning meta-data tags to each one or more of a source code units and/or subsets of the source code units, said tags representing classification attributes; generate semantic ID 110 based on linguistic, structural and contextual analyses of said set of data entities, said semantic ID corresponding to source code functionality of said one or more of a source code units and/or subsets of the source code units, said linguistic analysis employing linguistic clues, said structural linguistic analysis employing structural clues, and said contextual analysis employing contextual clues; and organize and store said set of data entities 112 in functionality representation index (FRI) architecture.

Figure 2:
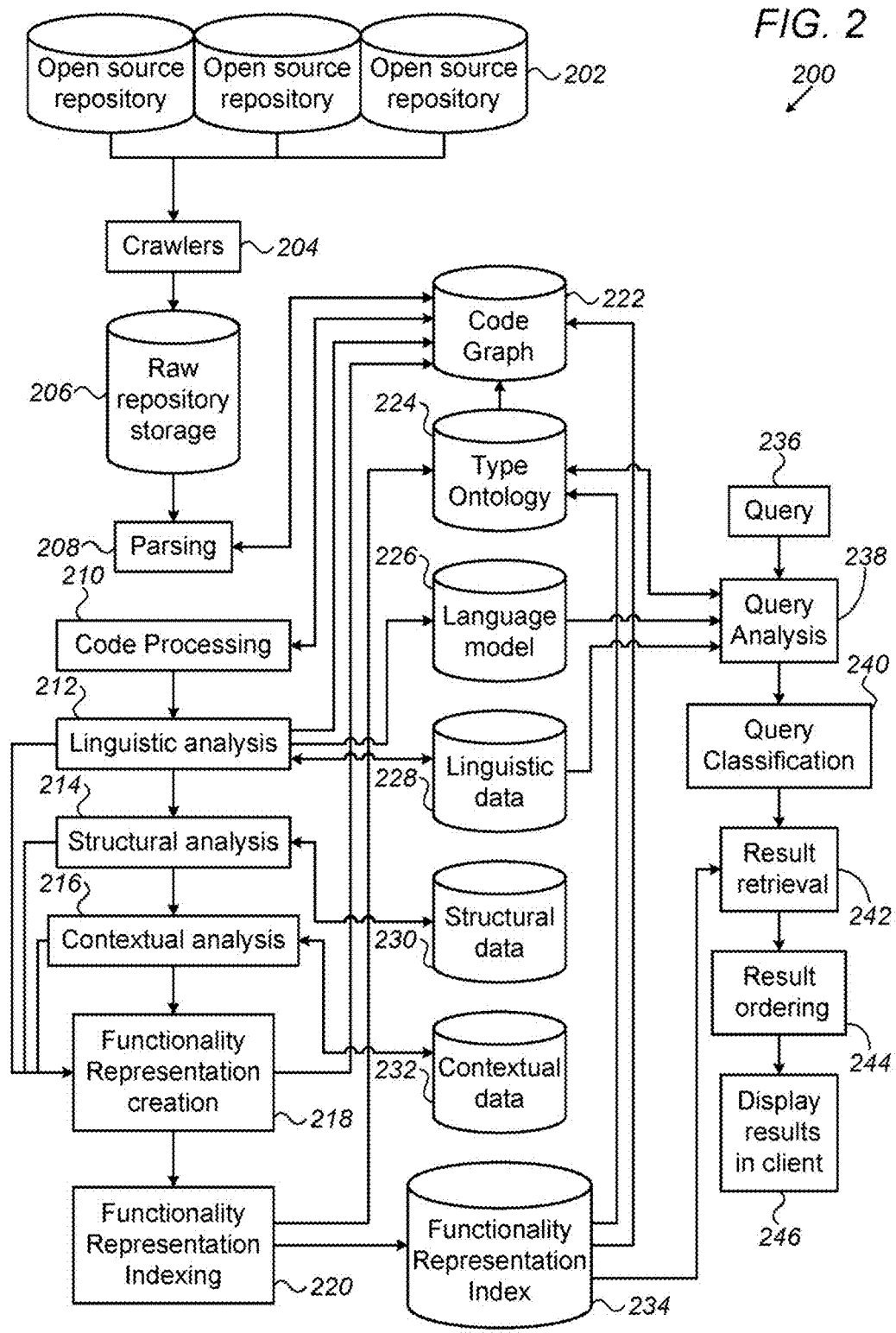
FIG. 2 graphically illustrates, according to another preferred embodiment of the present invention, an example of the system for organizing, functionality indexing and constructing a source code search engine.

Reference is made now to FIG. 2 which graphically illustrates, according to another preferred embodiment of the present invention, an example of the system for organizing, functionality indexing and constructing a source code search engine. The system is scalable to aggregate all the source code available in a code repository (such as on the web or in private repositories), organize, synthesize and analyze it in order, for example, to make it easily accessible for a user or another machine. The system comprises the code mining and organization module; the code functionality representation module; and the search engine module. The code mining and organization module is designed to crawl the code repository and aggregate source code on company servers. The aggregated code then goes through parsing and additional types of code analysis that add meta-data on each unit and add it to the system code graph and dependency graph. The code functionality representation module is configured to create a semantic representation layer of the code's functionality (actions it implements, on what entities, in what way, in which context, etc.). This semantic representation layer is used during search and analytics to match between the functionality sought in the query to the one represented by specific units of code. The search engine module is configured to analyze queries, translate them into the functionality representation language of the code units, and retrieve relevant units from the code graph using a functionality representation index (FRI).

Figure 3:
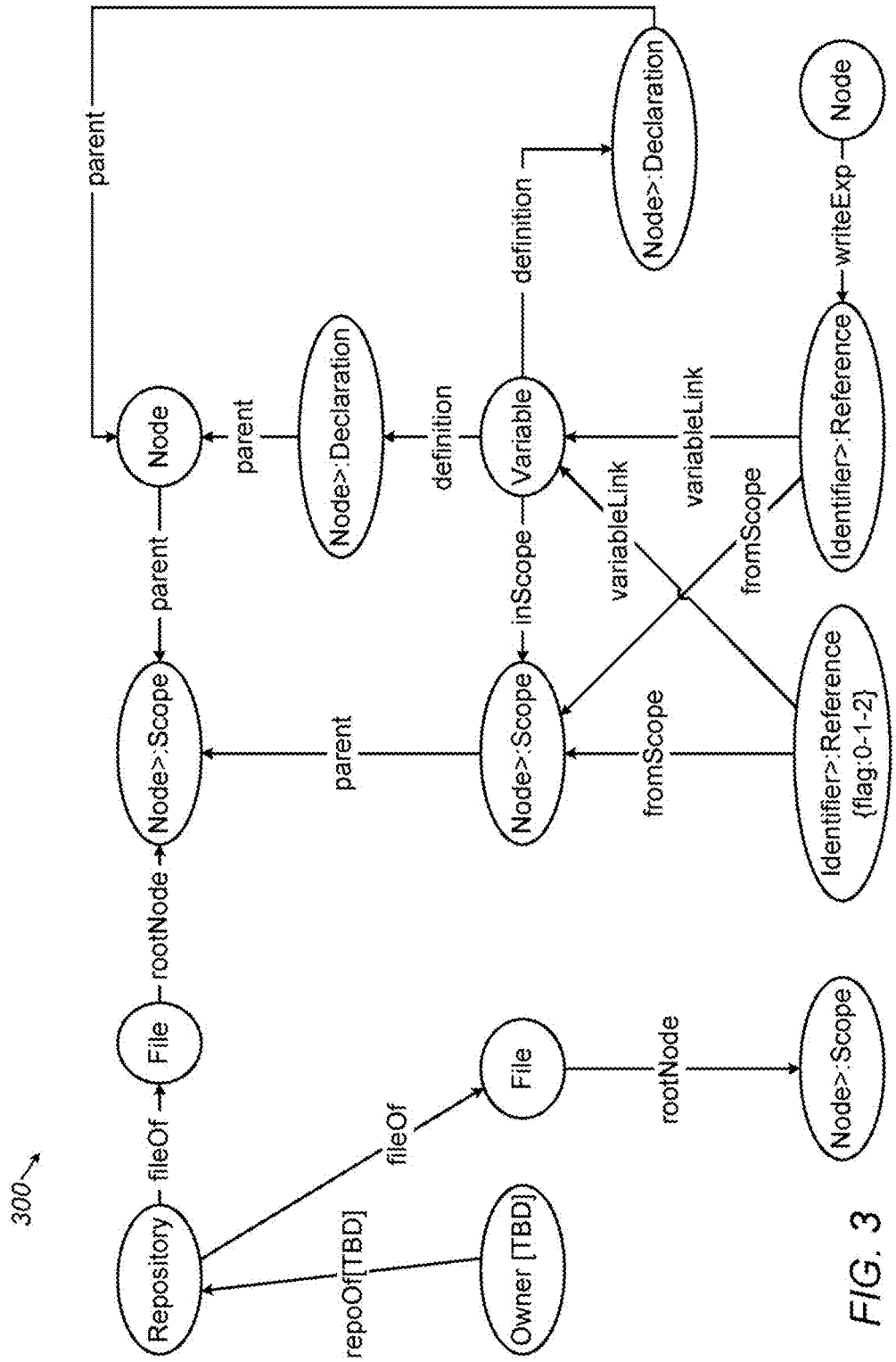
FIG. 3 graphically illustrates, according to another preferred embodiment of the present invention, an example of a computerized Code Graph (CG) structure.

As illustrated in FIG. 2, the crawlers 204 scrape projects from large Repositories 200 (such as GitHub and Bitbucket) and store them in the Storage Servers 206. The code mining and organization module is configured then to employ parsing mechanism 208 to parse the raw code in the repositories into Abstract Syntax Trees (ASTs), data structures representing the syntactic units of source code in a given language, detailing components such as variable names, class names, functions names, invocations, and more. These units are modeled as a Code Graph 222 (FIG. 3) such that each one or more of a source code units and/or subsets of the source code units is set as a vertex and the connections between units derivable from the AST are set as edges. This process is ongoing autonomously as new code is continually introduced into the repositories on the web and scraped by the system.

As the initial code graph is set by the parsers, an array of code processors 210 analyze the graph and add meta-data on units and sub-graphs while also adding new connections between them. Such enrichments of the graph may include adding classification attributes to units, indicating, for example, that a certain unit is a method or a class; connecting function invocations to the function's declaration; or determining that a unit implements a certain design pattern. Using these features, the system builds the type ontology (TO) architecture 224, a tree structure representing all native and community repositories available in a language, with their types and related information, such as methods, events and properties. In some implementations, organizing the code requires assigning it with qualitative attributes, such as cyclomatic complexity, ease-of-use (e.g. by level of documentation and clear naming), number of tests passed, and popularity. This is done by using computer-implemented techniques of static and dynamic code analysis.

The functionality representation creation module (FRCM) 218 is then configured to apply a sequence of semantic, structural and contextual analyses to create a semantic ID, which represents the functionality implemented by the unit (what this unit performs and how it performs it).

The system uses a variety of clues from each unit, along with its context in the graph, to derive its functionality representation: the linguistic analyzer 212 uses linguistic clues, such as important words in the unit's name, documentation, arguments names and types, as well as their semantic and syntactic roles in context; the structural analyzer 214 uses structural clues such as the syntactic common denominator in the implementation of certain actions (e.g. iteration) or design patterns (e.g. singleton); and the contextual analyzer 216 uses contextual clues like the class or repository to which a unit belongs, or which other units use it. Taken together, these clues are used to infer and then represent the functionality of each unit.

Statistics on all the units or subsets of units reside on dedicated databases. As such, statistics related to contextual information are stored in the contextual database 232; statistics related to structural information are stored in the structural database 230; and linguistic statistics are stored in the linguistic database 228, as are dictionaries and glossaries required for further code analysis and query processing, including synonym and collocation dictionaries. In some implementations of the linguistic processing part, the system uses the language model 226, a statistical n-grams model based on the distribution of words and phrases in "Programmese"—the English Dialect used by programmers to describe code and name its parts.

The functionality representation creation module (FRCM) 218 additionally is configured to apply a set of computer-implemented instructions to continuously use data from more informative units enriching less informative units and making inferences as to their attributes, so information flows in both directions between the processing module and the relevant databases 226 228 230 232. For example, the linguistic processing step uses well-documented units to infer the functionality of similar, less- or undocumented units.

The functionality representation indexing module (FRIM) 220 is configured to group units in the code graph 222 and type ontology 224 into functional clusters, stored in the functionality representation index, or FRI 234. It uses a set of computer-implemented instructions in a form of unique clustering algorithms to identify and represent proximity between units, and resulting unit clusters along different semantic, functional and structural parameters.

Therefore, units that implement the same functionality, even if the implementation itself is very different structurally, linguistically, etc., all receive the same functional identifier or FRID. For example, a function called 'generateRandomString' and another function called 'gen' may receive the same FRID if they both generate a random string, regardless of implementation details. Libraries, classes, regular expressions and other unit types are also assigned the same FRID for implementing the same functionality. So, for example, the FRID for email validation may include a regular expression which checks whether an email is valid, a native class that has several methods that perform different types of email validation, or a function from a community repository that performs the same functionality. These units are clustered on several abstraction levels simultaneously to allow different levels of granularity in search results.

The system deploys search engine module when a query 236 is received through the client to the search servers. The search engine module is configured to perform the query analysis 238 process comprising several lexical actions on the query, such as tokenizing it into words, cleaning it from redundant characters/words, and spellchecking it. It then performs a semantic analysis which uses statistical data from the Language Model 226 on the roles of words or phrases in different contexts, as well as information on native and community repositories from the type ontology 224 to tag each word in the query with its semantic role. Semantic roles help to understand the meaning of a word or phrase in a specific context, since the same word can have different meanings in different contexts. For example, the word 'email' can be an action in the context of 'email to members in list', it is an entity in the context of 'send email', and a repository in the context of 'email.js'.

In some implementations, the module performs the query classification 240 uses the words of the query and their semantic tags to classify the query into one or more of a closed set of query types. This classification helps the system determine important aspects of the search pattern and results to display. First, it helps determine the content of results to include, since each type of query calls for different content. For example, a query like 'sort', which is very general, calls for a variety of results, like different types of sorts ("bubble sort", "bucket sort"), in addition to common collocations, like "sort ascending", "sort by keys", and "sort array"; conversely, a query like "getElementById" calls for a specific method from a specific Javascript native library by the same name. Second, query classification helps determine the types of units to include in the search results: certain functionality types, like 'is alpha-numeric' are better implemented by small units like regular expressions or small functions, whereas other types, like image processing, natural language processing, machine learning algorithms, are better implemented by larger units like entire directories or libraries, which would therefore be preferred as search results. Third, query classification helps determine some aspects of results ranking—since each query type calls for a different type of result set, the ranking process is also different. Ranking of some sets puts more emphasis on certain types of content while others may emphasize unit type or the popularity of a result in previous searches. A fourth implementation determines results' diversity: how many types of results a query should yield and how they should be weaved together. Lastly, most important use of query classification, is establishing the search pattern in the functionality representation index 234 and type ontology 224, e.g. DFS vs. BFS, whether there are certain unit types that should be searched before others, etc.

In some implementations, the system further deploys the result retrieval 242 to use the search patterns and other constraints determined by the query classification phase to mine the relevant units in the code graph 222 and type ontology 224 through the functionality representation index 234. As mentioned above, the type ontology architecture facilitates pointers to source code units from community repositories of every language in the code graph, as well as information about the API of native libraries of each language—like native types, properties and methods. The functionality representation index 234 is an array of functionality representation IDs. Each ID refers to a unique functionality and holds pointers to the units in the code graph 222 and type ontology 224 which implement it. In some implementations units may have more than one FRID, as it may fulfill different unique functionalities. When the system identifies the searched functionality or functionalities, it looks for them in the code graph and once it finds the FRIDs of the intended functionality or functionalities, it retrieves the units with these IDs from the code graph 222 and type ontology 224.

In some implementations, the system further deploys result ordering 244 to order the set of results retrieved from the code graph and type ontology, applying the strategies and constraints from the query classification 240, which may include preferred content, types of units, ranking strategy and result diversity. The system in this phase also uses units' meta-data in the code graph, such as cyclomatic complexity, ease-of-use, a number of tests passed and popularity, to determine its position among other results. It then sends an ordered array of results to be displayed to the client 246.

In another aspect of the invention, code units are transformed to consumable and reusable entities, known as code components. Code components are code units enriched with associated metadata which allows them to be consumed and maintained as independent software entities. Such metadata includes, for example, information regarding development and testing environment, related test files, functionality, and/or API of the code unit.

Figure 4:
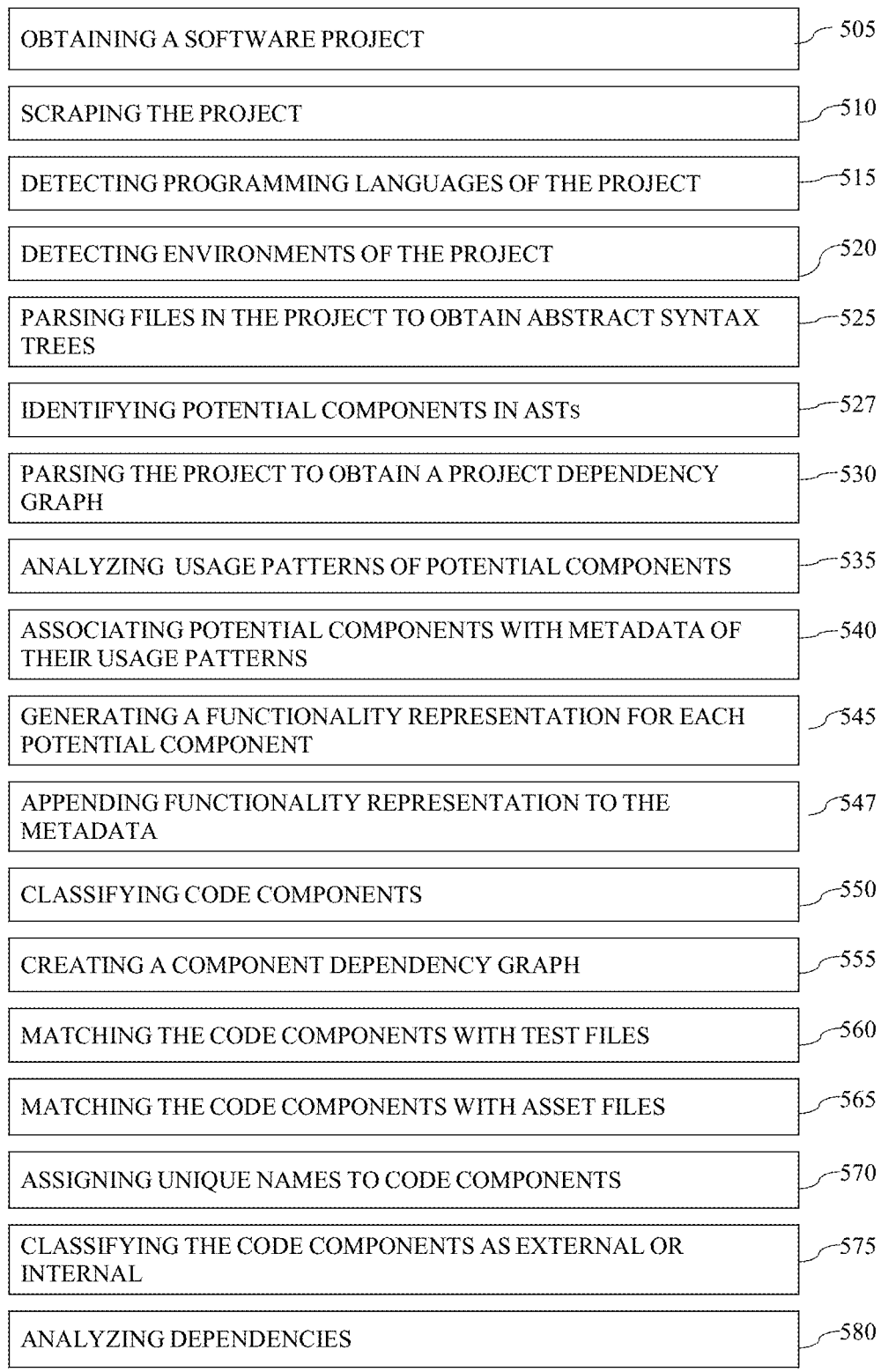
FIG. 4 graphically illustrates, according to a preferred embodiment of the present invention, a flow chart of a computer-implemented method for extracting and characterizing code components from a software project.

Reference is now made to FIG. 4, showing a flow diagram of a computer-implemented method 500 for extracting and characterizing code components from a software project.

In method 500, a software project is obtained 505 from a codebase. The codebase can be locally stored, stored on a network, or retrieved or accessed from the Internet; for example, by a URL of a project in an online repository such as Git.

Method 500 further comprises scraping the project 510. Scraping includes checks and preprocessing like formatting and encoding checks.

Method 500 further comprises detecting one or more programming languages in which the project is coded 515.

Method 500 further comprises detecting an environment of the project 520, which can include detecting development and/or test frameworks used in the project.

Figure 5:
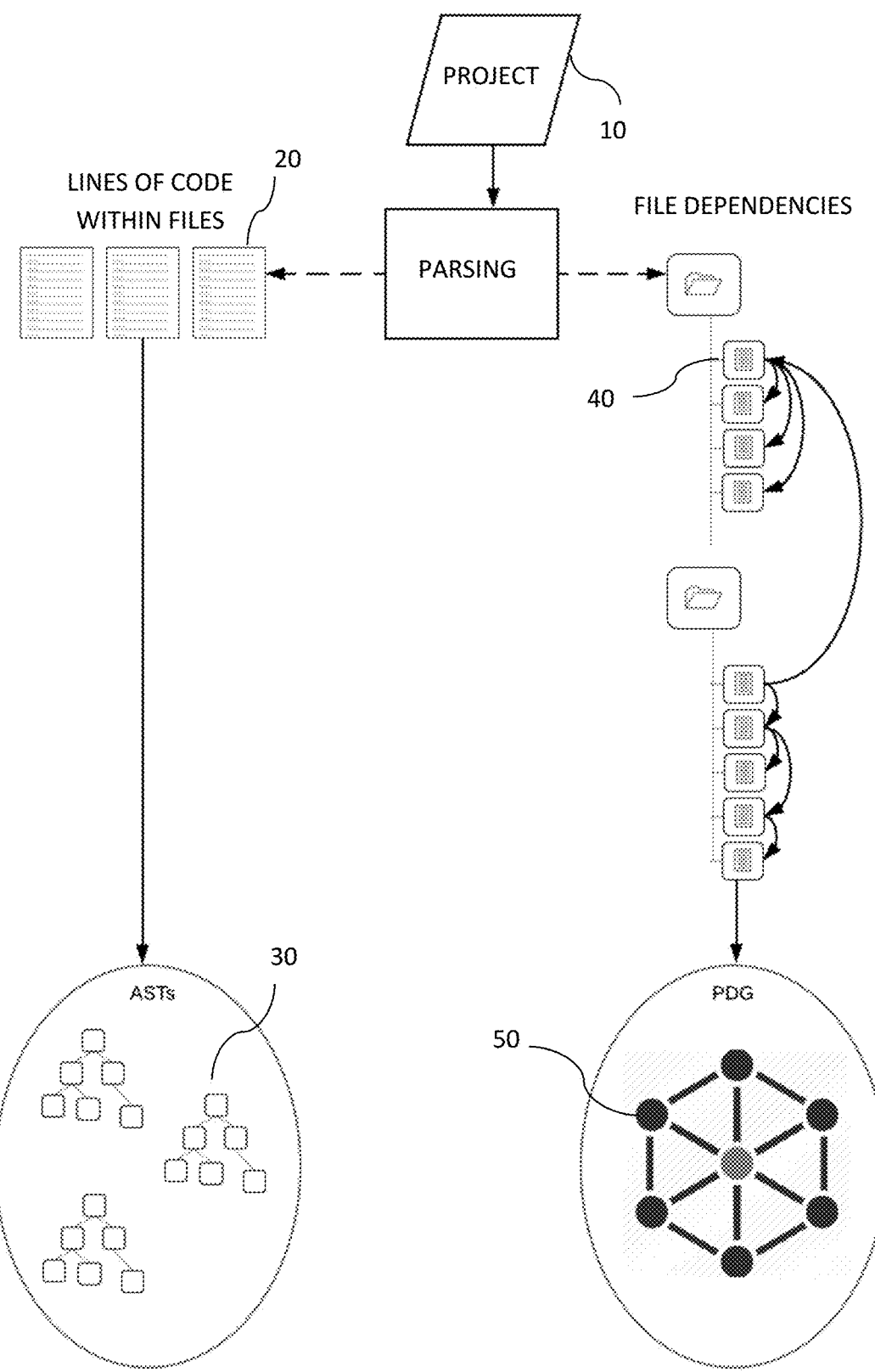
FIG. 5 graphically illustrates graph structures developed in parsing of a software project.

Method 500 further comprises parsing the project. Parsing steps include parsing the files in the project to obtain an abstract syntax tree of each file 525; and parsing the project across files to obtain a project dependency graph of the project 530. Reference is further also made to FIG. 5, showing a schematic diagram of development of graph structures developed by parsing.

Parsing 525 files of a project 10 entails breaking down each file in the project into small parts, e.g. parameter and variable names, types (if relevant), loops, namespaces, import statements, etc. Parsing step 525 may employ rules and/or statistical models for small code units within a file 20. Parsing step 525 produces an abstract syntax tree 30 of each file in the project. Nodes of each abstract syntax tree, and some combinations thereof are potential components of the project. For example, nodes of functions may be combined to form a potential component.

Parsing step 525 can be followed by identifying potential components in each abstract syntax tree 527. A potential component may be a single node in the abstract syntax tree or collectivized nodes in the abstract syntax tree.

Parsing across files of a project 530 entails analyzing the project's usage statements across files 40. Usage statements include file imports, function calls and class usage—to create a representation of usage patterns of each potential component. For example, a usage statement can be calling a certain function, importing a particular file, or class usage. Parsing step 530 produces a project dependency graph 50, in which the potential components are nodes and the usages are directed edges.

The steps of parsing files 525 and across files 530 are language-specific. However, the abstract syntax trees and project dependency graph can be language-agnostic.

Method 500 further comprises calculating usage patterns of potential components in the ASTs and the project dependency graphs 535. The analysis step 535 is performed by traversing the ASTs and project dependency graph and analyzing a usage statements of each of the potential components. In the ASTs, usage statements can comprise function calls, class instances, names, and descriptions. In the project dependency graph, usage statements comprise explicit statements, such as file imports, accessing information in other files.

A usage pattern of a potential component can be how many times the potential component is required, whether the potential component is required by siblings of the potential component in a same directory as the potential component, whether the potential component is required by a potential component in a parent directory, whether the potential component is required by a potential component in a cousin directory, whether the potential component is required as a whole or one or more parts of the potential component is required, which potential components requires the potential component, in which potential component a class instance used by the potential component is created, which potential components utilizes a class instance created by the potential component, code logic, structure, documentation, variable names, namespaces, file names, directory names, naming patterns across the project.

Method 500 further comprises associating potential components with metadata comprising their calculated usage patterns 540.

Method 500 further comprises generating a functionality representation for each potential component 545. A component's functionality is determined by a combination of: usage patterns; linguistic analysis, exploiting linguistic clues such as important words in the component's name, documentation, argument names and types, as well as their semantic and syntactic roles in context; structural analysis, using structural clues such as the syntactic common denominator in the implementation of certain actions (e.g. iteration) or design patterns (e.g. singleton); contextual analysis, noting to which repository a component belongs, which other components use the component, how the component interacts with other components, the actions performed by the component and the entities they are performed on, and APIs; and/or analysis of quality-related features such as complexity, execution time, and test results. Taken together, these clues are used to infer and then represent the functionality of each component.

Method 500 further comprises appending the functionality representation to the metadata of each potential component 547.

Method 500 further comprises classifying some potential components (in the ASTs and project dependency graph) as code components of the project 550. Code components are 1) easily discoverable using natural language or DSLs; 2) reusable by other components; and/or 3) easily analyzed in the context of other components in order to generate insights regarding the codebase. Classifying 550 entails deciding whether a potential component should be classified as a code component. Classifying step 550 employs an algorithm, such as a machine-learning or rule-based algorithm, based on a statistical model trained on componentized projects in the relevant language, wherein the training process involves learning mappings between software projects represented as files and repositories connected on a dependency graph and their componentized counterparts. The trained statistical model utilizes the metadata (e.g., the usage patterns, functionality representation) as well as other properties (e.g., names) as features of algorithm.

A component dependency graph is created 555, wherein each node is associated with a code component and its appended metadata, which can include an interface of the code component.

Method 500 further comprises matching each code component with test files 560 and with asset files 565, if any, of the project. The test files and asset files matching the node are appended to the metadata of the code component's node in the code dependency graph.

Method 500 further comprises assigning a unique name to each code component 570.

Method 500 further comprises classifying each of the code components as an external component (i.e., reusable in other projects) or an internal component 575 (i.e., less reusable or non-reusable in other projects; e.g., configuration and constant files). In some embodiments, each code component is assigned an extent, over a distributed range, to which the code component is reusable in other projects.

Method 500 further comprises analyzing file dependencies within each code component to identify a main file, if any, of the code component 580.

Method 500 further comprises creating edges between component nodes in the component dependency graph 585. The edges are associated with the dependencies found in step 575 and with the accumulated metadata.

In some embodiments, method 500 further comprises a step (not shown) of using existing functionality representations to ameliorate (improve) the identification and classification of code components. For example, when there are functionality representations of a large number of code components, the represented functionalities may be enumerated. Whether a potential code component fulfills an enumerated functionality can be considered as a statistical factor in determining the potential component should be classified as a code component.

Figure 6:
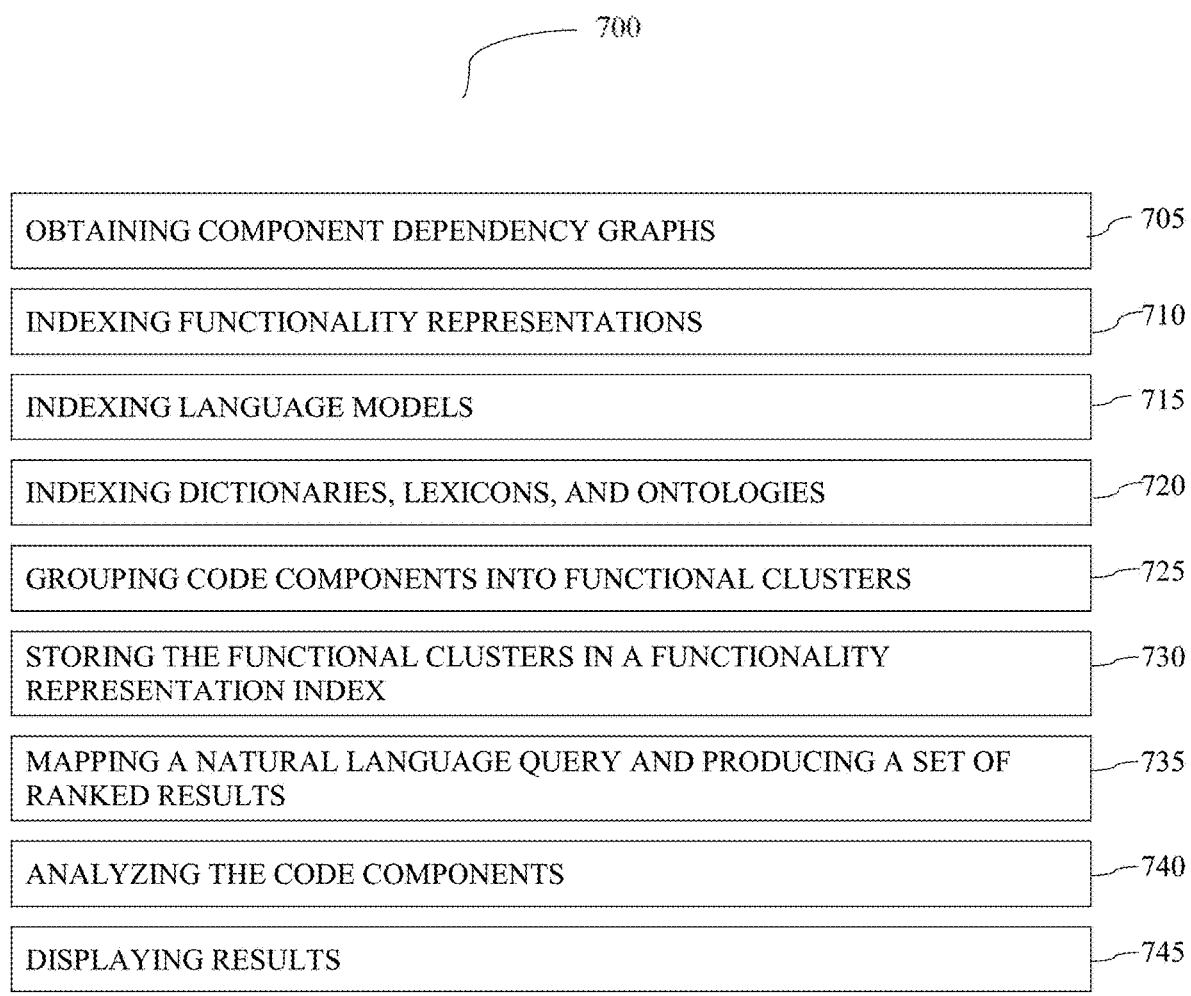
FIG. 6 graphically illustrates, according to a preferred embodiment of the present invention, a flow chart of a computer-implemented method for discovering and analyzing software components in a codebase.

Reference is now made to FIG. 6, showing a flow diagram of a computer-implemented method 700 for discovering and analyzing software components in a codebase, according to some embodiments of the invention.

Method 700 comprises a step of obtaining a component dependency graph of code components stored in a code repository 705, with the code components each associated with metadata comprising a functionality representation of the code component. Creating the component dependency graph 705 can be implemented by a method 500 for automatically extracting and characterizing code components from a software project, further described herein. Dependency graphs may be obtained from one or more software projects in the codebase. The codebase can be a codebase of an organization's software projects or a public codebase such as Git.

Method 700 further comprises a step of indexing the functionality representations 710.

Method 700 further comprises a step of indexing language models 715.

Method 700 further comprises a step of indexing dictionaries, lexicons, and ontologies 720.

Method 700 further comprises a step of grouping code components from the component dependency graphs into functional clusters 725. Step 725 employs clustering algorithms to identify and represent linguistic, structural and contextual proximity between components, and resulting component clusters along different semantic, functional and structural parameters.

Method 700 further comprises a step of storing said functional clusters in a functionality representation index (FRI) 730.

Method 700 further comprises a step of mapping a natural language query to one or more functional identifiers (FRIDs) in the FRI and producing a set of ranked results 735. In mapping 735, for example, a component called 'copy_directory' and another called 'dir' may receive the same FRID if they both copy a directory, regardless of implementation details. Mapping into FRIDs 725 entails examining significant parameters and primary actions of code components for equivalency. Different configuration parameters, for example, will not forbid two components from being considered similar. In addition, code components performing the same action or otherwise providing the same functionality using completely different implementations (structurally, linguistically, etc.) and still be can considered similar and assigned the same FRID. The query may be made, for example, by a programmer seeking code components for a particular functionality. Components with a common FRID can be ranked in the search result, suggesting the strongest candidates for a specific queried functionality.

Method 700 further comprises providing discoverability and analytics of the code components 740. Having already broken down an entire codebase into components and performed semantic computations on these components (e.g., in method 500) now allows an array of code analytics, enabling insights and analysis regarding entire projects and codebase repositories with more than one project. For example, analytics can include one or more of producing a code map; analyzing projects or components within each project; retrieving a full list of components across the codebase, a list of duplicate components (structurally and functionally); determining which developers created which components, the most widely-used components, and which components in the code base best implement each type of functionality.

Method 700 further comprises a step of displaying results of the analytics 745, on a display device or printed.

Figure 7:
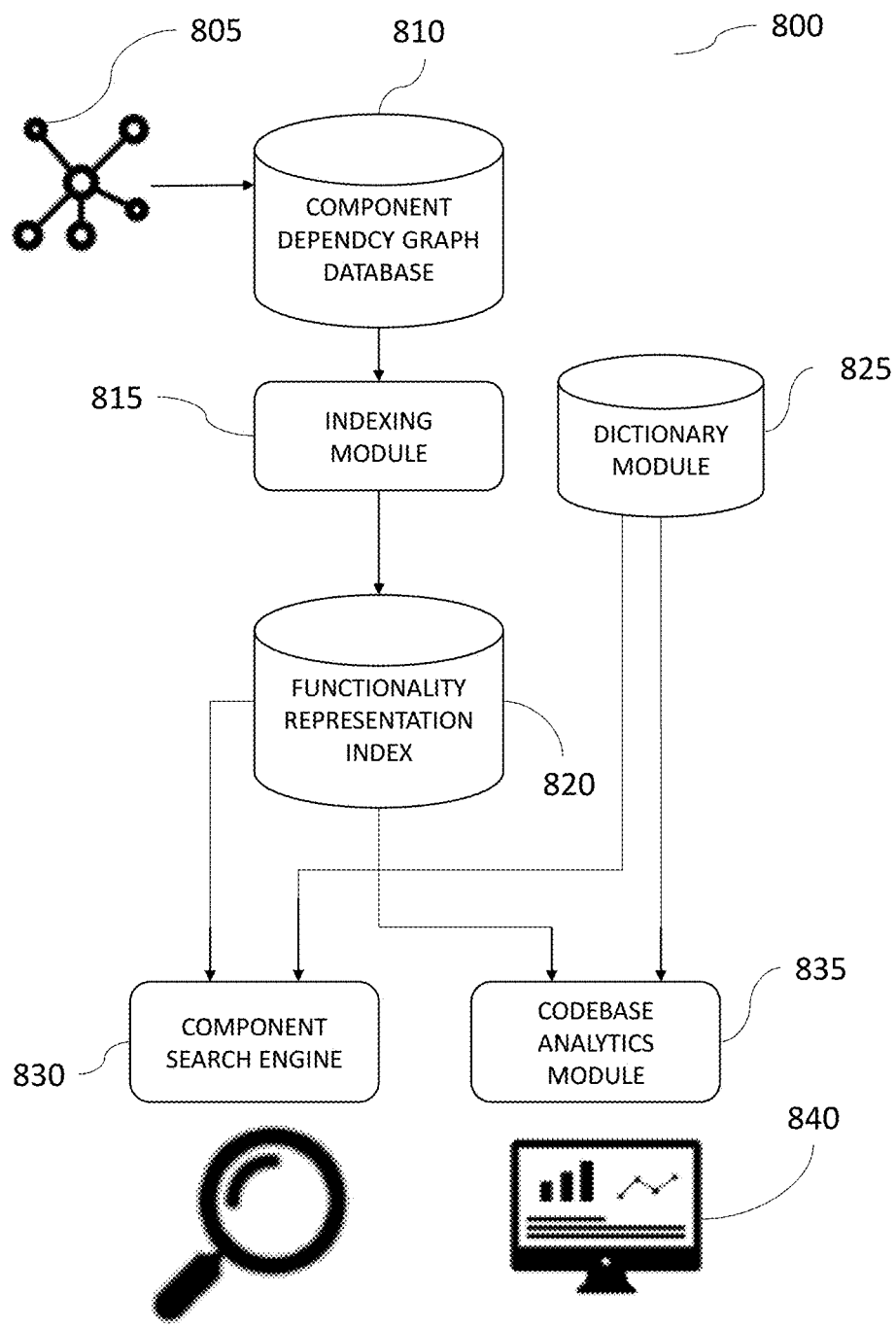
FIG. 7 graphically illustrates, according to a preferred embodiment of the present invention, a system for discovering and analyzing software components in a codebase.
Figure 8:
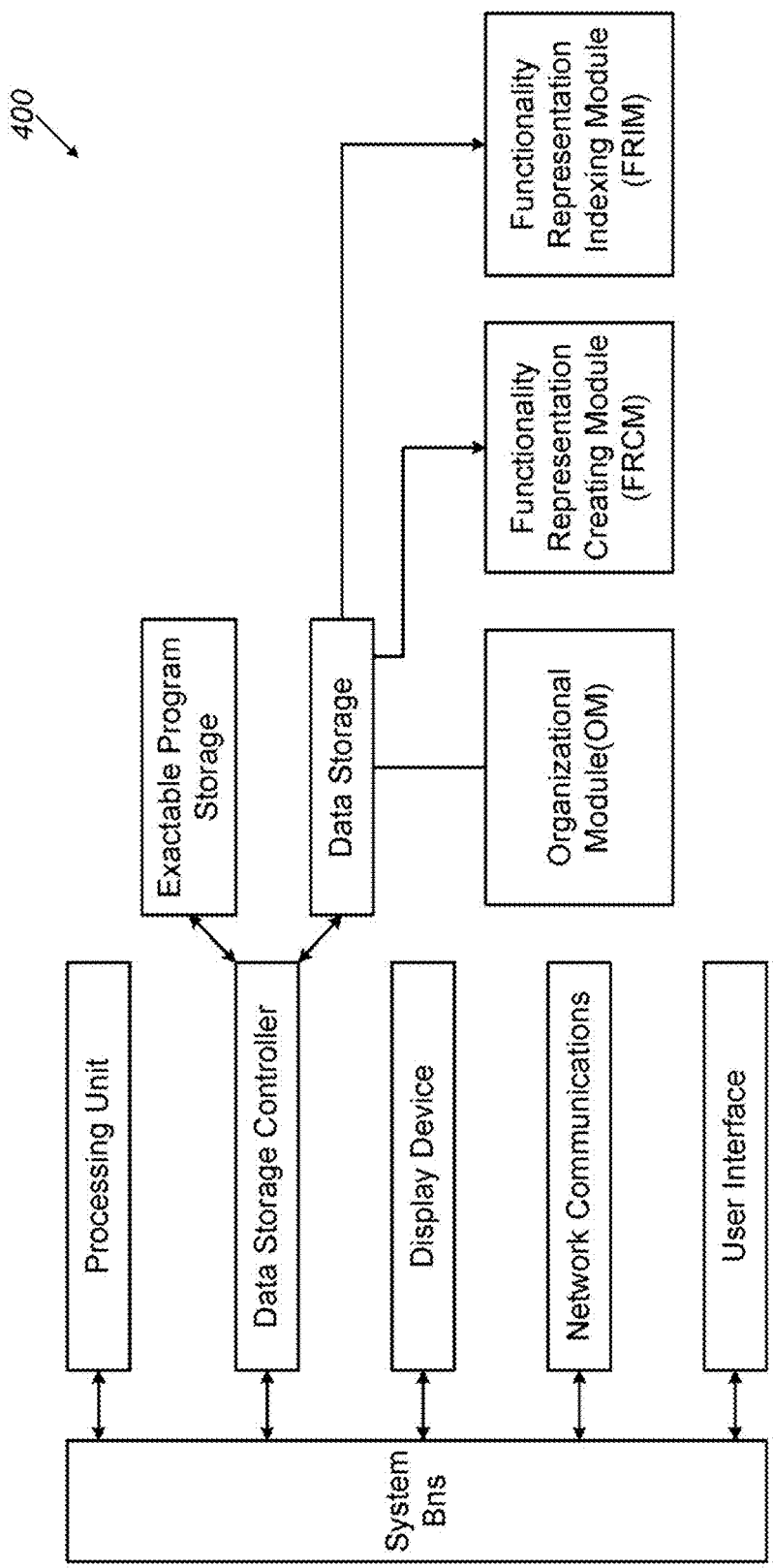
FIG. 8 graphically illustrates, according to another preferred embodiment of the present invention, an example of computerized environment for implementing the invention.

Reference is now made to FIG. 7, showing a system 800 for discovering and analyzing software components in a codebase, according to some embodiments of the invention.

System 800 comprises
a) a component dependency graph database 810, configured to store one or more component dependency graphs 805 of code components stored in a code repository and associated metadata comprising a functionality representation of each said component;
b) a feature indexing module 815, configured to
  i) index said functionality representations;
  ii) index language models;
  iii) index dictionaries, lexicons, and ontologies;
  iv) group code components from the component dependency graphs into functional clusters; and
c) a functionality representation index configured to store said functional clusters (FRI);
d) a component search engine 830, configured to map a natural language query to one or more functional identifiers (FRIDs) in said FRI and produce a set of ranked results;
e) a codebase analytics module 835, in connection with a display, configured to analyze said code components and display said code component analysis and insights and analysis regarding entire projects and code bases (repositories with more than one project);

f) a display module 840, configured to display said component analysis.

Reference is made now to FIG. 7 which graphically illustrates, according to another preferred embodiment of the present invention, an example of computerized system for implementing the invention 400. The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C #, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The invention claimed is:

1. A computer-implemented method for organizing, functionality indexing and constructing a source code search engine, the method comprising:
   a. crawling a set of data entities in a repository system, each of the data entities representing one or more of a source code units and/or subsets of the source code units;
   b. parsing said set of data entities into abstract syntax trees (ASTs) architecture;
   c. modeling said set of data entities into a code graph (CG) architecture such that each one or more of a source code units and/or subsets of the source code units are set as vertices and connections between said each one or more of a source code units and/or subsets of the source code units are set as edges;
   d. establishing type ontology (TO) architecture of said set of data entities by processing said set of data and assigning meta-data tags to each one or more of a source code units and/or subsets of the source code units, said tags representing classification attributes;
   e. generating semantic ID based on linguistic, structural and contextual analyses of said set of data entities, said semantic ID corresponding to source code functionality of said one or more of a source code units and/or subsets of the source code units, said linguistic analysis employing linguistic clues, said structural linguistic analysis employing structural clues, and said contextual analysis employing contextual clues; and
   f. organizing and storing said set of data entities in functionality representation index (FRI) architecture.

2. The method of claim 1, wherein the data entity is selected from the group consisting of integers, strings, Booleans, characters, files, arrays, lists, maps, and tables and any combinations thereof.

3. The method of claim 1, further comprising storing said set of data entities in one or more storage search server systems.

4. A computer-implemented method for automatically extracting and characterizing code components from a software project, comprising steps of
   a. obtaining one or more software projects stored in a non-transitory computer readable medium;
   b. scraping said projects;
   c. detecting one or more programming languages of each of said projects;
   d. detecting one or more environments of each said project;
   e. parsing each file in each said project to obtain an abstract syntax tree of each said file;
   f. identifying potential components in each said abstract syntax tree, said potential components comprising single nodes and/or collectivized nodes in said abstract syntax tree;
   g. parsing said project across said files of each said project to obtain a project dependency graph of said project, said files being additional potential components of said project;
   h. analyzing usage patterns of said potential components in said ASTs and said project dependency graph;
   i. associating each said potential component with metadata comprising said usage patterns of said component;
   j. generating a functionality representation for each potential component by analyzing said usage patterns, said dependencies and linguistic, contextual, and structural information of potential component;
   k. appending said functionality representation each said potential component to said metadata of said potential component;
   l. classifying a subset of the potential components as code components, using a statistical model trained on componentized projects; said statistical model employing said metadata as features;
   m. creating a component dependency graph, each node of said component dependency graph associated with a said code component;
   n. matching the code components with test files of the project, if any, and appending matched test files to said metadata of matched code components;
   o. matching the code components with asset files of the project, if any and appending matched asset files to said metadata of matched code components;
   p. assigning a unique name to each said code component;
   q. classifying each said code component as an external or internal component;
   r. analyzing file dependencies of each said code component to identify a main file, if any, of said code component;
   s. creating edges between component nodes in the component dependency graph, said edges associated with said dependencies and with metadata regarding types of connections between said code components of said component nodes.

5. The method of claim 4, wherein said code components comprise code units associated with said metadata rendering said code components consumable and maintainable as independent software entities.

6. The method of claim 4, wherein said metadata of each component further comprises package dependencies of said project from which said component was extracted.

7. The method of claim 4, wherein said potential code components comprise folders, files, snippets, regular expressions, or any combination thereof.

8. The method of claim 4, wherein said usage statements comprise any in a group consisting of file imports, function calls, class usage, and any combination thereof.

9. The method of claim 4, wherein the project dependency graph is language agnostic.

10. The method of claim 4, wherein said usage patterns of a said potential component comprise any in a group consisting of: how many times said potential component is required, whether said potential component is required by siblings of said potential component in a same directory as said potential component, whether said potential component is required by a potential component in a parent directory, whether said potential component is required by a potential component in a cousin directory, whether said potential component is required as a whole or one or more parts of said potential component is required, which potential components requires said potential component, in which potential component a class instance used by said potential component is created, which potential components utilizes a class instance created by said potential component, code logic, structure, documentation, variable names, namespaces, file names, directory names, naming patterns across the project, and any combination thereof.

11. The method of claim 4, wherein said statistical model employs characteristics of said potential components selected from said usage patterns, names, file type, or any combination thereof.

12. The method of claim 4, further comprising a step of using said functionality representation to ameliorate said classification.

13. The method of claim 4, wherein said internal and external components are assigned an extent, over a distributed range, to which each said code component is reusable in other projects.

14. A computer-implemented method for providing discoverability and analytics for software components in a codebase, comprising steps of
   a. obtaining one or more component dependency graphs of code components stored in a code repository, said code components each associated with metadata comprising a functionality representation of said component;
   b. indexing said functionality representations;
   c. indexing language models;
   d. indexing dictionaries, lexicons, and ontologies;
   e. grouping code components from the component dependency graphs into functional clusters;
   f. storing said functional clusters in a functionality representation index (FM);
   g. mapping a natural language query to one or more functional identifiers (FRIDs) in said FRI and producing a set of ranked results;
   h. analyzing said code components; and
   i. displaying results of analyzing code components and insights and analysis regarding entire projects and codebase repositories with more than one project.

15. The method of claim 14, wherein a said functionality is defined by features of a said component selected from a group comprising actions performed, entities performed on, interaction with other components and APIs, complexity, execution time, test results, and any combination thereof.

16. The method of claim 14, further comprising a step of applying a statistical n-gram model to programming terms among said semantic functionalities, thereby generating a said dictionary of said functionalities.

17. The method of claim 14, further comprising receiving a said query through a client to a storage search server system from a user.

18. The method of claim 14, further comprising a step of tagging each word or phrase in said query, each tag representing semantic role of said each word in said query.

19. The method of claim 14, further comprising a step of classifying the words in said query into one or more sets of defined query types.

20. The method of claim 14, wherein said step of analyzing comprises any in a group consisting of analysis of an organization's: projects, codebase, list of structurally and functionally duplicate components, components created by an individual developer, most widely used components, components best implementing a said functionality, and any combination thereof.

* * * * *